United States Patent
Eastham

(10) Patent No.: US 7,840,810 B2
(45) Date of Patent: Nov. 23, 2010

(54) SYSTEMS AND METHODS FOR REJOINING A SECOND GROUP OF NODES WITH A FIRST GROUP OF NODES USING A SHARED GROUP KEY

(75) Inventor: W. Bryant Eastham, Draper, UT (US)

(73) Assignee: Panasonic Electric Works Co., Ltd., Osaka (JP)

( * ) Notice: Subject to any disclaimer, the term of this patent is extended or adjusted under 35 U.S.C. 154(b) by 953 days.

(21) Appl. No.: 11/624,521

(22) Filed: Jan. 18, 2007

(65) Prior Publication Data

US 2008/0175387 A1    Jul. 24, 2008

(51) Int. Cl.
 *H04L 9/08* (2006.01)
 *H04L 9/32* (2006.01)
 *H04K 1/00* (2006.01)

(52) U.S. Cl. .................. 713/171; 713/163; 380/273; 380/278; 380/281

(58) Field of Classification Search .......... 713/163, 713/171; 380/278, 281, 273
See application file for complete search history.

(56) References Cited

U.S. PATENT DOCUMENTS

| | | | |
|---|---|---|---|
| 5,748,736 A | 5/1998 | Mittra | |
| 6,195,751 B1 | 2/2001 | Caronni et al. | |
| 6,529,515 B1 | 3/2003 | Raz et al. | |
| 6,742,045 B1 | 5/2004 | Jordan et al. | |
| 6,870,844 B2 | 3/2005 | Tuck et al. | |
| 7,234,063 B1 * | 6/2007 | Baugher et al. | 713/189 |
| 2007/0016663 A1 * | 1/2007 | Weis | 709/223 |
| 2008/0080713 A1 * | 4/2008 | Cho et al. | 380/273 |
| 2008/0101611 A1 * | 5/2008 | Lindholm et al. | 380/277 |

* cited by examiner

*Primary Examiner*—Michael J Simitoski
(74) *Attorney, Agent, or Firm*—Austin Rapp & Hardman

(57) ABSTRACT

A method for rejoining a second group of nodes with a first group of nodes is described. A first state of a first group key associated with a first group of nodes is received. The first state of the first group key is multicast to a second group of nodes. The first group key is rekeyed to a second group key associated with the second group of nodes. A second state of the second group key is multicast to the second group of nodes. A third state of a third group key associated with the first group of nodes is received. A rekey command is multicast to the second group of nodes if the third state is different from the second state. The second group key is rekeyed to the third group key.

20 Claims, 7 Drawing Sheets

SYSTEMS AND METHODS FOR REJOINING A SECOND GROUP OF NODES WITH A FIRST GROUP OF NODES USING A SHARED GROUP KEY

TECHNICAL FIELD

The present invention relates generally to computers and computer-related technology. More specifically, the present invention relates to systems and methods for rejoining a second group of nodes with a first group of nodes using a shared group key.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded devices or embedded systems. (The terms "embedded device" and "embedded system" will be used interchangeably herein.) An embedded system usually refers to computer hardware and software that is part of a larger system. Embedded systems may not have typical input and output devices such as a keyboard, mouse, and/or monitor. Usually, at the heart of each embedded system is one or more processor(s).

Embedded systems may be used to monitor or control many different systems, resources, products, etc. With the growth of the Internet and the World Wide Web, embedded systems are increasingly connected to the Internet so that they can be remotely monitored and/or controlled. Other embedded systems may be connected to computer networks including local area networks, wide area networks, etc. As used herein, the term "computer network" (or simply "network") refers to any system in which a series of nodes are interconnected by a communications path. The term "node" refers to any device that may be connected as part of a computer network.

Some embedded systems may provide data and/or services to other computing devices using a computer network. Alternatively, there may be typical computers or computing devices that provide data and/or services to other computing devices using a computer network. Nodes may share state among themselves using a network. Networks are not perfect, and sometimes networks may become segmented or disconnected. This may result in loss of connectivity between sets of nodes that were communicating, and cause their shared state to diverge. When this partitioning is resolved, the previously communicating nodes may have difficulty communicating again because of this diverged state. It is beneficial to minimize this difficulty. Benefits may be realized if systems and methods were available for rejoining a second group of nodes with a first group of nodes using a shared group key.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
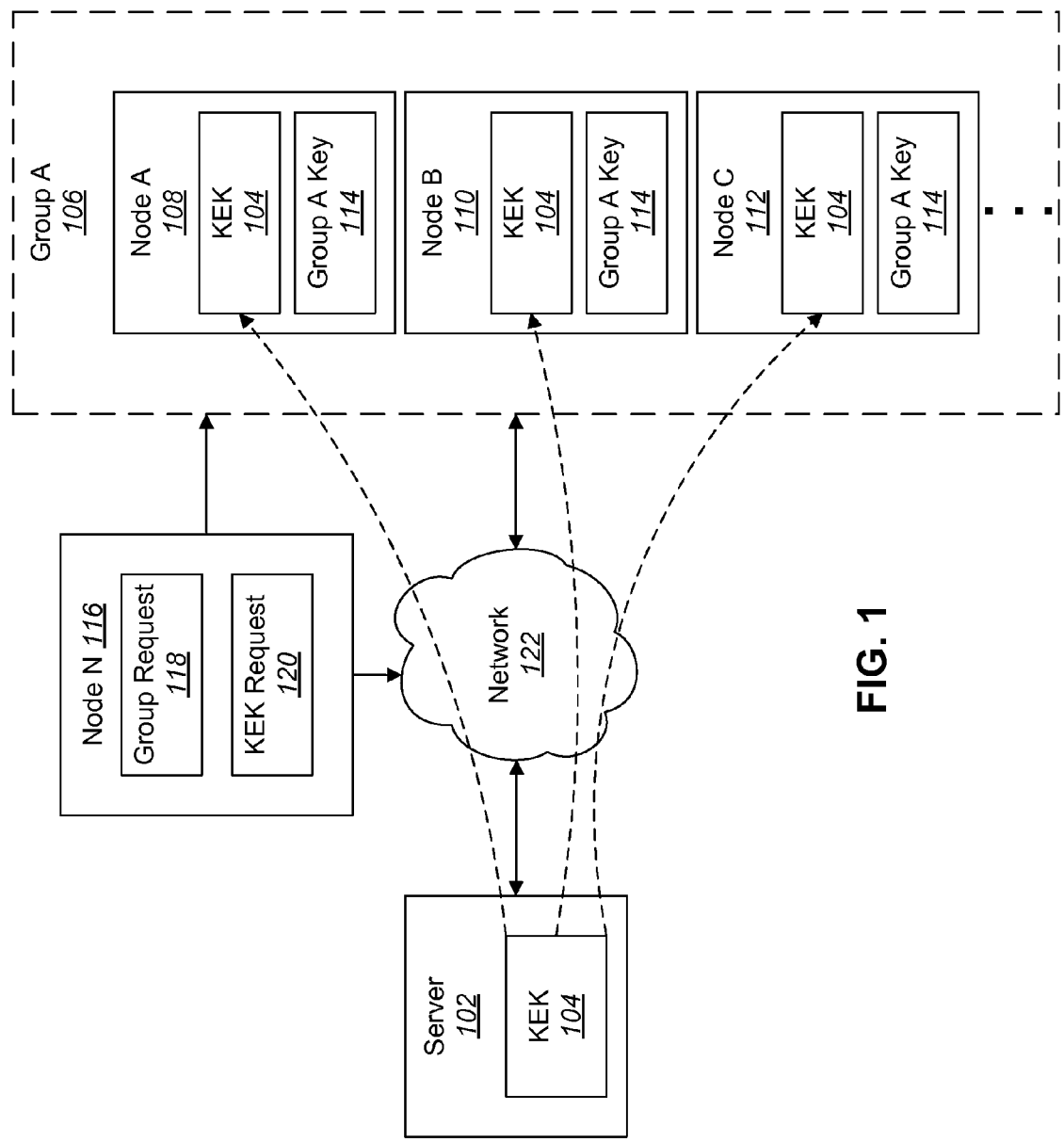
FIG. 1 is a block diagram illustrating one embodiment of a server communicating a key exchange key (KEK) to one or more nodes within a secure multicast group.

A method for rejoining a second group of nodes with a first group of nodes is described. A first state of a first group key associated with a first group of nodes is received. The first state of the first group key is multicast to a second group of nodes. The first group key is rekeyed to a second group key associated with the second group of nodes. A second state of the second group key is multicast to the second group of nodes. A third state of a third group key associated with the first group of nodes is received. A rekey command is multicast to the second group of nodes if the third state is different from the second state. The second group key is rekeyed to the third group key.

The first group may be a secure multicast group of nodes. The first state may be sent from a managing node of the first group of nodes. The second state may be sent from a managing node of the second group of nodes. One or more nodes of the first group of nodes may be partitioned into the second group of nodes. Communications between the managing node of the first group of nodes may be disconnected from the nodes comprising the second group of nodes.

In one embodiment, each state may include a key exchange key (KEK). Nodes that include the key exchange key (KEK) may receive each state. Each group key may include a group key parameter, wherein the group key parameter indicates the amount of time each group key has been utilized by a group of nodes. A managing node may be selected that comprises the group key with the highest group key parameter. Each node comprising the first group of nodes and the second group of nodes may comprise a node identifier, wherein the node identifier indicates the order of when the node joined the first group of nodes. A managing node may be selected that comprises the lowest node identifier.

In one embodiment, the rekey command is encrypted with a group key. A managing node of the second group of nodes may comprise the first group key and the second group key.

A computer system that is configured to rejoin a second group of nodes with a first group of nodes is also described. The computer system comprises a processor and memory in electronic communication with the processor. Instructions are stored in the memory. A first state of a first group key associated with a first group of nodes is received. The first state of the first group key is multicast to a second group of nodes. The first group key is rekeyed to a second group key associated with the second group of nodes. A second state of the second group key is multicast to the second group of nodes. A third state of a third group key associated with the first group of nodes is received. A rekey command is multicast to the second group of nodes if the third state is different from the second state. The second group key is rekeyed to the third group key.

A computer-readable medium comprising executable instructions for rejoining a second group of nodes with a first group of nodes is also described. A first state of a first group key associated with a first group of nodes is received. The first state of the first group key is multicast to a second group of nodes. The first group key is rekeyed to a second group key associated with the second group of nodes. A second state of the second group key is multicast to the second group of nodes. A third state of a third group key associated with the first group of nodes is received. A rekey command is multicast to the second group of nodes if the third state is different from the second state. The second group key is rekeyed to the third group key.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices. Computer-readable mediums comprising executable code include both transitory and non-transitory mediums.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Computer networks may include multiple nodes. Nodes may be referred to as computing devices. The multiple nodes may be organized into one or more groups. A single node may communicate with the other nodes in its group. In one embodiment, the single node multicasts information to the other nodes in its group. Multicasting may include transmitting information simultaneously to each member of a group. The single node may multicast a state to the other nodes within the group. A state may include a unique configuration of information regarding a program or other aspect of a computing device.

Multicasting a state may be desirable for scalable secure multicast groups. A problem may occur when the network becomes fragmented. For example, an original group of nodes may be fragmented into various fragmented groups of nodes. The state that was once shared between members of the original group may diverge. For example, groups of nodes typically control its own key. Over time, a group may periodically rekey. The new key may be randomly chosen, so the probability that different fragmented groups of nodes will rekey to the same key is low.

The partitioning of groups may be correct behavior until the network problem is resolved. In other words, the group(s) should not fail based on a hardware failure, assuming that some sets of nodes can still communicate. However, when the network problem is resolved, and each of the fragmented groups of nodes may again communicate with each other, the state should converge as quickly as possible.

The present systems and methods relate to a group of nodes determining a group manager. Any node in the group may serve as the manager, and more than one node may serve as the manager at any given time. The manager periodically advertises its state to the nodes in its group. Additionally, the manager advertises its state in a way that other fragmented groups of nodes may extract it. The primary piece of the state that is common to the various fragmented groups of nodes is a key exchange key (KEK). Any fragmented groups of nodes that use the same KEK may communicate with each other. Additional states such as timing parameters and a group key may diverge over time. These parameters may be advertised and protected by the KEK. In other words, nodes that do not possess the KEK may not be allowed to extract these parameters from the state.

When a partition occurs, each fragmented group of nodes may determine a different manager. The nodes in a fragmented group may determine a manager automatically when they stop hearing the periodic advertisements of the state from their previous manager. If there happen to be multiple managers for a single group at any one time, the multiple managers will hear each other's advertisements. If the state in these multiple advertisements is an exact duplicate, one of nodes will cease to be the manager. The manager with the oldest state, or the lower node identifier in the case of a tie, may continue as the manager of the fragmented group. There are, of course, other methods for determining a group manager that could be used. If a partitioning occurs but is resolved before a divergence of the state, then the above logic may solve the problem of multiple managers when the fragmented groups of nodes begin to communicate again.

If a partition occurs for a long enough time the states corresponding to the various fragmented groups may diverge. When the partitioning is resolved and communication resumes, there will be multiple managers of fragmented groups advertising different states to nodes that belonged to the original group. The nodes belonging to the various fragmented groups may share the same KEK. Even though a manager may know that a particular advertisement is valid, it may not trust that the packet is current because of the possibility of replay attacks. For example, a malicious node may store a previous advertisement, and then replay that advertisement at a later time. This kind of replay should not cause the nodes to react.

If a manager of a fragmented group of nodes hears an advertisement that contains a partial match to its state, it may 'join' the group identified by the other manager. This join may be almost identical to the process of a node joining the group for the first time, and may be protected against replay attacks. If the join is successful, then the manager of the fragmented group is in possession of both sets of state. The manager may then rekey its own fragmented group of nodes to match the state of the other group of nodes—effectively healing the group very quickly. The same logic as described above (i.e., which state is older) may be used to determine which manager rekeys, as the situation is symmetric (i.e., both managers may hear each others advertisements).

FIG. 1 is a block diagram illustrating one embodiment of a server 102 communicating a key exchange key (KEK) 104 to one or more nodes within group A 106. In one embodiment, the server 102 is an authentication server. An authentication server may be a server that authenticates nodes desiring to join group A 106. In one embodiment, the server 102 authenticates a node and the node receives the KEK 104. A node may join group A 106 by using the KEK 104 to verify its ability to join the group A 106 to the other nodes belonging to group A 106. In one embodiment, the server 102 maintains a minimal state regarding each node of group A 106. For example, the server 102 may simply maintain the state of the KEK 104. The server 102 may communicate changes to the KEK 104 to the nodes of group A 106.

As illustrated, group A 106 includes node A 108, node B 110 and node C 112. While group A 106 is illustrated with only three nodes, it is to be understood that group A 106 may include more or less nodes. Group A 106 may be referred to as a secure multicast group because nodes within group A 106 may multicast information to each other in a secure manner. For example, information that is multicast between the nodes of group A 106 may be encrypted with a shared group A key 114. The nodes may use the KEK 104 to receive the group A key 114 that is associated with group A 106. For example, node N 116 may request to become a member of group A 106 by sending a group request 118 to one or more nodes of group A 106. The one or more nodes of group A 106 may determine if node N 116 includes the KEK 104. If node N 116 includes the KEK 104, the one or more nodes may distribute the group A key 114 to node N 116. The group A key 114 may enable a node to send information to and receive information from other nodes within group A 106. Nodes may use the group A key 114 to encrypt and decrypt information that is multicast between the nodes of group A 106.

If node N 116 does not possess the KEK 104, node N 116 may send a KEK request 120 to the server 102, requesting that the server 102 distribute the KEK 104 to node N 116. The server 102 may authenticate node N 116 and distribute the KEK 104. However, if the KEK 104 is not distributed to node N 116, node N 116 may not join group A 106 and receive the group A key 114.

Communications between the server 102, group A 106 and node N 116 may be over a network 122. The network 122 may include any communications network, such as, but not limited to, a global communications network, the Internet, a computer network, a telephone network, a pager network, a cellular network, a wide-area network (WAN), a local-area network (LAN), etc. In one embodiment, the server 102 may manage and communicate with multiple groups of nodes over the network 122. The server 102 may distribute a KEK that is specific to each group of nodes.

Figure 2:
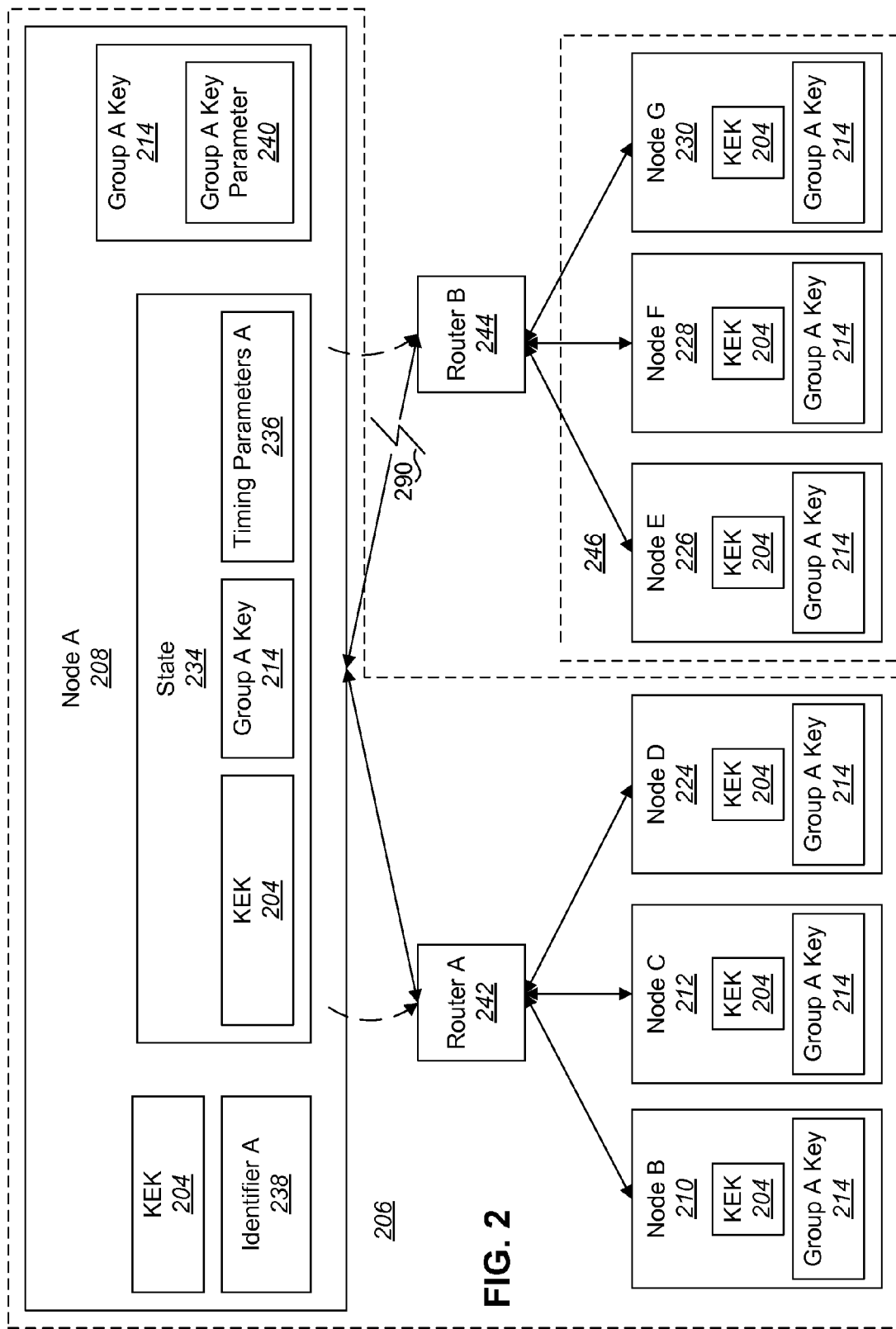
FIG. 2 is a block diagram illustrating one embodiment of a second group of nodes being partitioned from a first group of nodes.

FIG. 2 is a block diagram illustrating one embodiment of a second group of nodes 246 being partitioned from a first group of nodes 206. The first group 206 may include a multicast group of nodes, such as group A 106. In one embodiment, node E 226, node F 228 and node G 230 originally belong to the first group 206. While the depicted embodiment includes seven nodes, it is to be understood that more or less nodes may be included in the first group 206 and the second group 246.

Nodes A-G, 208, 210, 212, 224, 226, 228, 230 may include the KEK 204 and the group A key 214. In one embodiment, the group A key 214 includes a group A key parameter 240. The parameter 240 may indicate the amount of time that the group A key 214 has been utilized by the members of the first group 206. For example, the members of the first group 206 may control the group A key 214. The group A key 214 may change periodically which results in the nodes rekeying the group A key 214 to a changed, new group key. The group A key parameter 240 may indicate how long the current group A key has been in use by the members of the first group 206.

In one embodiment, node A 208 includes identifier A 238. Identifier A 238 may indicate the order in which node A 208 joined the first group 206. For example, if node A 208 was the third node to join the group 206 and node B 210 was the fourth node to join the group 206, identifier A 238 may indicate a "3" and identifier B (not shown) may indicate a "4". While only node A 238 is illustrated including an identifier, it is to be understood that each node in the group 206 may include a corresponding identifier.

In one embodiment, node A 208 is determined to be a group manager of the first group 206. The group manager may be responsible to periodically multicast information regarding the group key and other parameters to the remaining nodes in the group. In one embodiment, node A 208 is determined to be the group manager because identifier A 238 includes the lowest value. In other embodiments, the group manager may be the node that starts advertising first, a node that is manually set as the manager by an administrator, etc. In other embodiments, a node may be determined to be the group manager following any commercially available methods.

Node A 208 may include a state 234. The state 234 may indicate the current values of certain parameters. For example, the state 234 may include the KEK 204, the group A key 214 and timing parameters A 236. Timing parameters A 236 may indicate how often node A 208 multicasts the state 234 to the nodes in the group 206. In one embodiment, the group A key 214 and timing parameters A 236 are protected with the KEK 204. In other words, nodes without the KEK 204 may not be allowed to extract these parameters from the state 234.

Node A 208 may multicast the state 234 to node B 210, node C 212 and node D 224 utilizing router A 242. Similarly, node A 208 may multicast the state 234 to node E 226, node F 228 and node G 230 through router B 244. While the illustrated embodiment depicts node A 208 multicasting the state 234 through two routers, it is to be understood that nodes may multicast information using any number of routers, switches, other networking equipment, wiring, etc. The nodes 210, 212, 224, 226, 228, 230 may utilize the KEK 204 to extract the group A key 214 and timing parameters A 236 from the state 234. If the group A key 214 included on the nodes 210, 212, 224, 226, 228, 230 does not match the group A key 214 included in the state 234, the nodes may rekey the group A key 214 to match the group key included in the state 234. As previously stated, multicast groups may periodically change the group key. Frequent multicasts of the state 234 including the group A key 214 enables the nodes to rekey to the current group key associated the group the 206.

In one embodiment, communication between node A 208 and router B 244 is lost or limited 290. For example, router B 244 may fail and as such, the state 234 sent from node A 208 may not be passed to the nodes 226-230 that are connected to router B 244. In one embodiment, node E 226, node F 228 and node G 230 are partitioned from the first group 206 into the second group 246. Node A 208 may still multicast the state 234 to node B 210, node C 212 and node D 224 over router A 242. Thus, the original first group 206 is partitioned into two groups 206, 246. While only two groups 206, 246 are illustrated, it is to be understood that the first group 206 may be partitioned into more groups of nodes.

Figure 3:
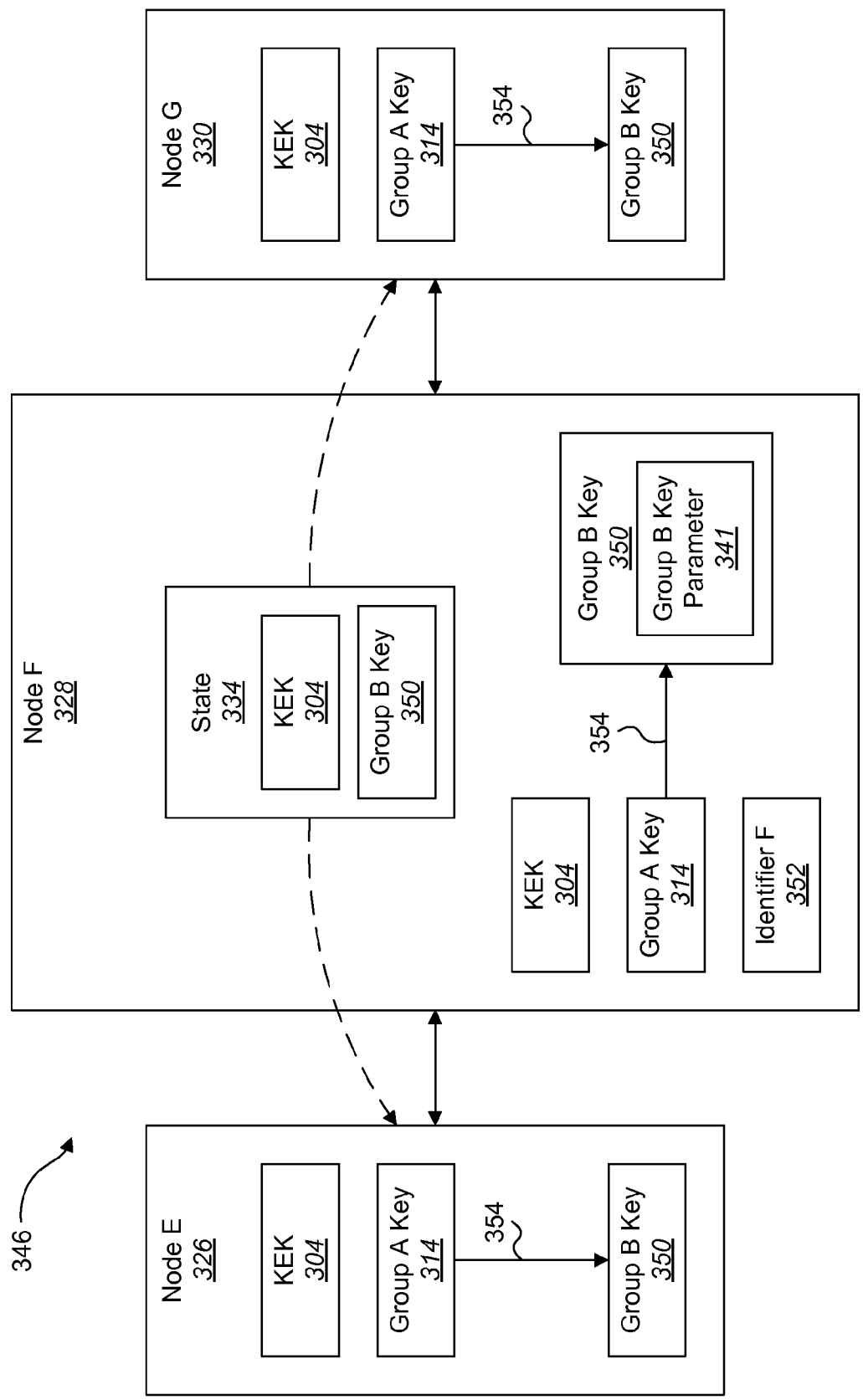
FIG. 3 is a block diagram illustrating a further embodiment of the second group of nodes.

FIG. 3 is a block diagram illustrating a further embodiment of the second group 346 of nodes. In one embodiment, the second group 346 includes node E 326, node F 328 and node G 330. The nodes 326, 328, 330 may determine a second group manager when they 326, 328, 330 stop receiving periodic multicasts of the state from the manager of the first group 206. For example, nodes E-G 326-330 may determine a second group manager when they stop receiving the state 234 from node A 208. In one embodiment, any node within the second group 346 may function as the second group manager. In the depicted embodiment, node F 328 is determined to be the second group manager because node F 328 begins to multicast a state 334 to the nodes belonging to the second group 346. Node F 328 may include identifier F 352 which indicates the order in which node F 328 joined the original first group 206.

The nodes 326-330 of the second group 346 may initially use the same group key they previously used as members of the first group 206. For example, the nodes 326-330 may still utilize the group A key 314. In a further embodiment, the second group manager node F 328 may immediately change the group B key 350 when it becomes the group manager. At a later time, members of the second group 346 may rekey 354 the group A key 314 to a random new group key, such as a group B key 350. In a further embodiment, the members still belonging to the first group 206 (not shown), may also rekey the group A key 314 to a random new group key. Because each group 206, 346 randomly rekeys the group A key 314, the probability that the first group 206 and second group 346 rekey the group A key 314 to an identical new group key is low.

In one embodiment, the group B key 350 is now used by the members of the second group 346 to multicast information to each other. The group B key 350 may include a group B key parameter 341 that indicates the amount of time the group B key 340 has been utilized by the second group 346.

As the manager of the second group 346, node F 328 may multicast the state 334 to the other members of the second group 346. In one embodiment, the state 334 includes the KEK 304 and the group B key 350. The KEK 304 may protect the group B key 350 such that nodes that do not possess the KEK 304 may not extract the group B key 350 from the state 334. Node E 326 and node G 330 may extract the group B key 350 from the state 334 to verify that they possess the current group key for the second group 346.

Figure 4:
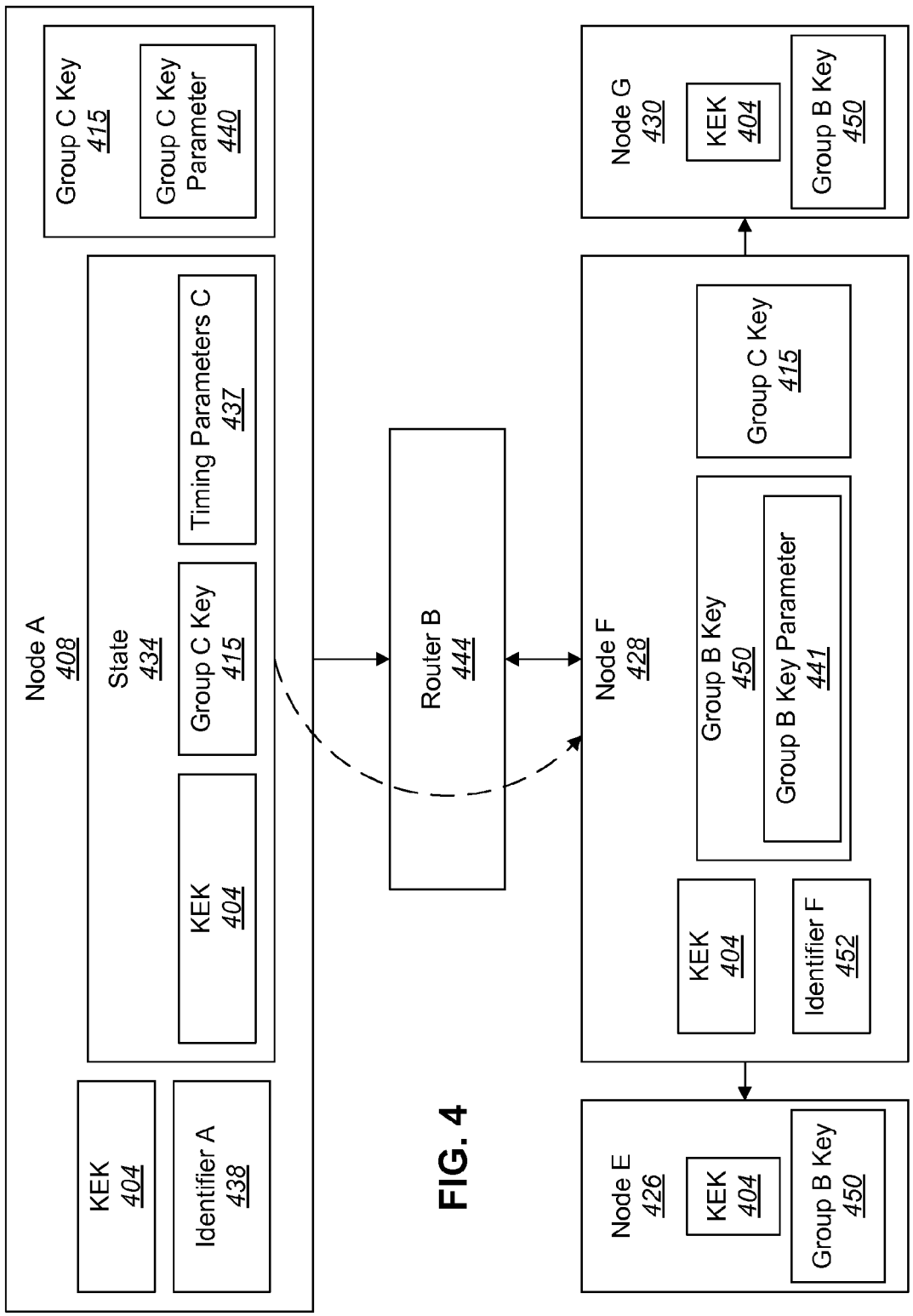
FIG. 4 is a block diagram illustrating one embodiment of a managing node of the second group of nodes joining the first group of nodes.

FIG. 4 is a block diagram illustrating one embodiment of a managing node of a second partitioned group of nodes joining a first partitioned group of nodes. In one embodiment, node A 408 is a managing node of a first group 206 (not shown) and node F 428 is a managing node of a second group 246 (not shown). As previously explained, the nodes within the second group 246 are partitioned from the first group 206 when communications between the manager of the first group and nodes of the second group 246 are somehow lost or limited. In one embodiment, communications between node A 408 and router B 444 are lost; as such node A 408 is unable to multicast a state 434 to node E 426, node F 428 and node G 430. At a later time, communications between node A 408 and the second group 246 may be reestablished through router B 444.

As previously explained, when the second group 246 is partitioned from the first group 206, each group 206, 246 may still utilize the same group key, such as the group A key 114. At some time later, each group 206, 246 may randomly rekey the group A key 114. For example, the first group may randomly rekey the group A key 114 to a group C key 415 and the second group 246 may randomly rekey the group A key 114 to a group B key 450.

When communications between node A 408 and the nodes of the second group 246 are reestablished, node A 408 may multicast the state 434, which includes the KEK 404, the group C key 415 and timing parameters C 437. The group C key 415 and timing parameters C 437 may be protected by the KEK 404. In one embodiment, nodes E-G 426-430 each receive the state 434 from node A 408. Nodes E-G 426-430 may each include the KEK 404 which allows them to extract the protected group C key 415 and timing parameters C 437 from the state 434. However, nodes E-G 426-430 include the group B key 450 which may be different from the group C key 415. Node E 426 and node G 430 may ignore the state 434 sent from node A 408 because the state 434 was not sent from the manager of the second group 246 (i.e., node F 428).

In one embodiment, the manager of the second group 246, node F 428, may accept the state 434 from node A 408. Node F 428 may use the KEK 404 to extract the parameters from the state 434. The group C key 415 may include a group C key parameter 440, and the group B key 450 includes a group B key parameter 441. As previously explained, the group key parameter may indicate how long the group key has been utilized. In one embodiment, node F 428 compares the group C key parameter 440 and the group B key parameter 441. If the group C key parameter 440 indicates that the group C key 415 has been in use for a greater amount of time than the group B key 450, node F 428 may store the group C key 415. Node F 428 may then join the group identified by the state 434 in order to validate that it is current and not replayed. In one embodiment, node F 428 now belongs to both the first group 206 and the second group 246. In a further embodiment, node F 428 rekeys the group B key 450 to the group C key 415. By rekeying to the group C key 415, node F 428 determines that node A 408 should continue as a managing node. As such, node A 408 is responsible for subsequent multicasts of the state 434.

In one embodiment, the group C key parameter 440 and the group B key parameter 441 are identical, which indicates that the group C key 415 and the group B key 450 have been used for the same amount of time. Node A 408 and node F 428 may determine which node continues as the manager node by evaluating identifier A 438 and identifier F 452. In one embodiment, the node with the lowest identifier continues as the manager. For example, identifier A 438 may include a lower value than identifier F 452. As such, node F 452 may rekey the group B key 450 to the group C key 415. In a further embodiment, node A 408 and node F 438 use other methods to determine which will continue as manager. The node that will not continue as manager rekeys its group to the group key 114 of the other group.

Figure 5:
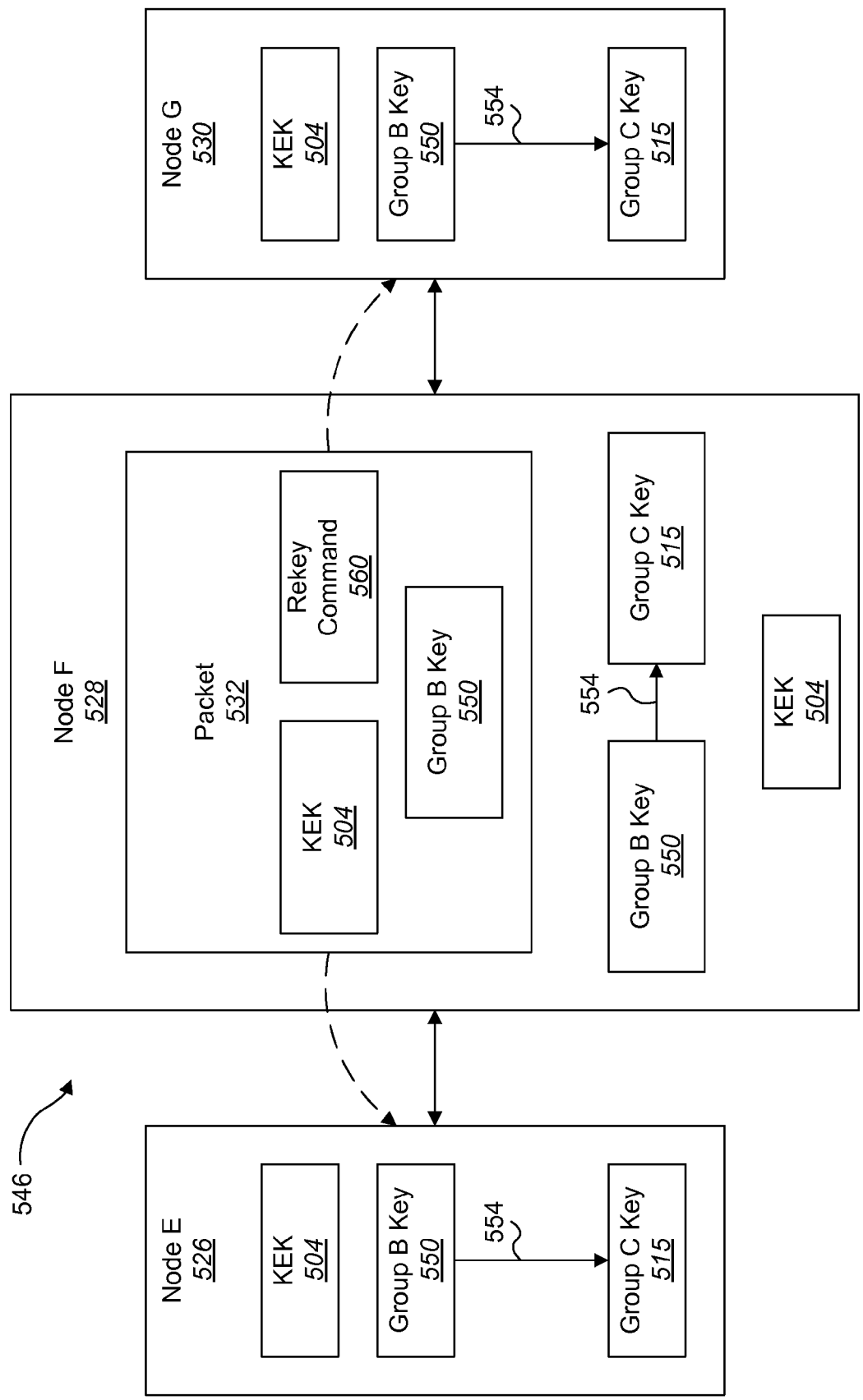
FIG. 5 is a block diagram illustrating one embodiment of the second group of nodes rejoining the first group of nodes.

FIG. 5 is a block diagram illustrating one embodiment of the second group 546 rejoining the first group 206. In one embodiment, the group key associated with the second group 546 is rekeyed to the group key associated with the first group 206. A manager of the second group 546 may multicast a rekey command 560 to the nodes in the second group 546. For example, node F 528 may be the manager of the second group 546. As previously explained, node F 528 may receive the state 434 regarding the group key corresponding to the first group 206 (i.e., the group C key 515) and may verify that the state 434 is currently valid and not replayed. Node F 528 may multicast a packet 532 including a KEK 504 and the rekey command 560. In one embodiment, nodes that do not include the KEK 504 may not receive the packet 532. Further, the rekey command 560 may be encrypted using the shared group key of the second group 546 (i.e., the group B key 550).

Node E 526 and node G 530 may receive the packet 532 and decrypt the rekey command 560 using the group B key 550. The rekey command 560 may include a command to rekey the shared group key to a different shared group key. For example, node E 526 and node G 530 may receive a command to rekey 554 the group B key 550 to the group C key 515. Node F 528 may also rekey 554 the group B key 550 to the group C key 515 after the rekey command has been multicast to the nodes of the second group 546. Rekeying to the group C key 515 may allow nodes E-G 526-530 to receive additional data and information from the nodes within the first group 206. In other words, nodes E-G 526-530 rejoin the group that they were members of before being partitioned into the second group 546. Additionally, allowing the manager of the second group 546 to multicast the rekey command 560 may minimize requests on the manager of the first group 206. For example, node A 408 may experience a heavy load due to numerous requests for the group C key 515 if each node within the second group 546 sent a rekey request to node A 408. The present systems and methods enable the manager of the second group 546 (or a small set of managing nodes) to multicast the rekey information to the nodes belonging to the second group, thus eliminating an increase of the load on node A 408.

Figure 6:
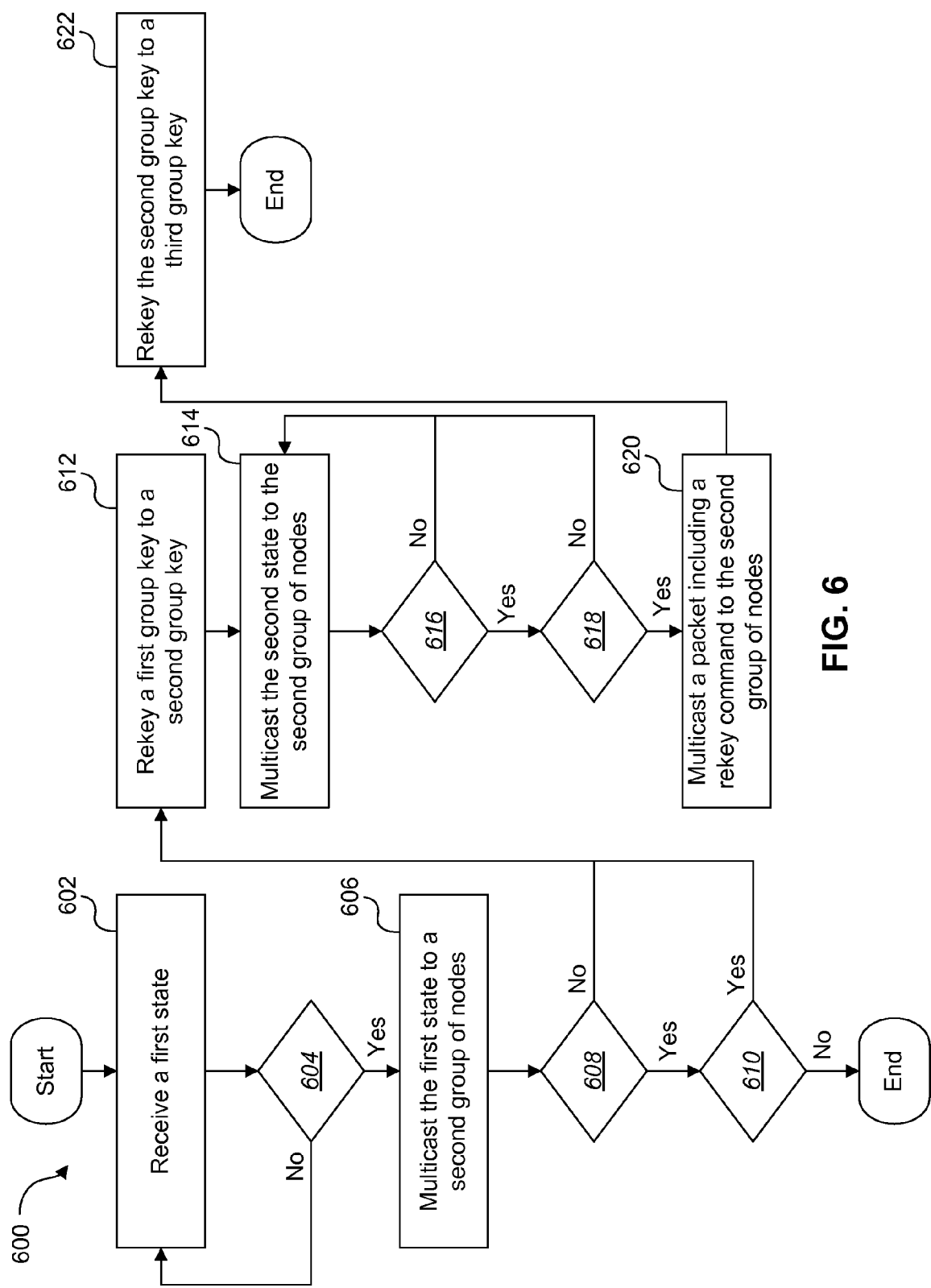
FIG. 6 is a flow diagram illustrating one embodiment of a method for multicasting a rekey command to one or more nodes within a fragmented group of nodes.

FIG. 6 is a flow diagram illustrating one embodiment of a method 600 for multicasting a rekey command to the second group of nodes 246. In one embodiment, the method 600 is implemented by a node designated as the manager of the second group 246. A first state may be received 602. In one embodiment, the first state includes a first group key associated with a first group of nodes 206, such as group A 106. The state may be received 602 periodically. A determination 604 is made whether a pre-determined time has expired since receiving 602 the most recent state. If the time has not expired, the node continues to periodically receive 602 the first state. If the pre-determined time has expired, the first state is multicast 606 to the second group of nodes 246. In one embodiment, the second group of nodes 246 is partitioned from the first group of nodes 206 when the first state is not periodically received 602 from a managing node of the first group 206.

A determination 608 is made whether additional states are received. For example, a node that belongs to the second group 246 may multicast 606 the first state, and the node may also receive one or more states from one or more separate nodes belonging to the second group 246. If the method 600 determines 608 that the received one or more states are identical to the first state, a determination 610 is made whether the received one or more states have existed for a greater amount of time than the first state. In other words, a determination 610 is made whether the first state is older than the received one or more states. If the received one or more states are older than the first state, the method 600 ends. However, if the node does not receive one or more states or if the received one or more states are not older than the first state, the node that multicast the first state may be designated as a managing node of the second group of nodes 246.

The first group key may be rekeyed 612 to a second group key. In one embodiment, the first group key is randomly rekeyed 612 to the second group key. A second state, including the second group key, may be periodically multicast 614 to the second group of nodes 246. In one embodiment, the nodes within the second group 246 rekey 612 the first group key to the second group key.

A determination 616 may be made whether a third state, which is different than the second state, is received. The third state may include a third group key associated with the first group of nodes 206. If a third state is not received, the second state continues to be periodically multicast 614 to the second group of nodes. If a third state is received, a determination 618 is made whether the third state has existed for a greater amount of time than the second state. In other words, a determination 618 is made whether the third state is older than the second state. If the second state is determined to be older than the third state, the second state continues to be periodically multicast 614 to the second group of nodes.

However, if the third state is determined 618 to be older than the second state, a packet including a rekey command may be multicast 620 to the second group of nodes 246. The rekey command may instruct the second group of nodes 246 to rekey the second group key to the third group key. In one embodiment, the rekey command is encrypted with the second group key. Nodes that include the second group key may decrypt the rekey command. In one embodiment, the nodes previously belonging to the second group of nodes 246 may now include the third group key, which may be associated with the first group of nodes 206. In one embodiment, each group key included in each state may be protected by the KEK 104. In one embodiment, nodes that include the KEK 104 may receive each group key and each state.

Figure 7:
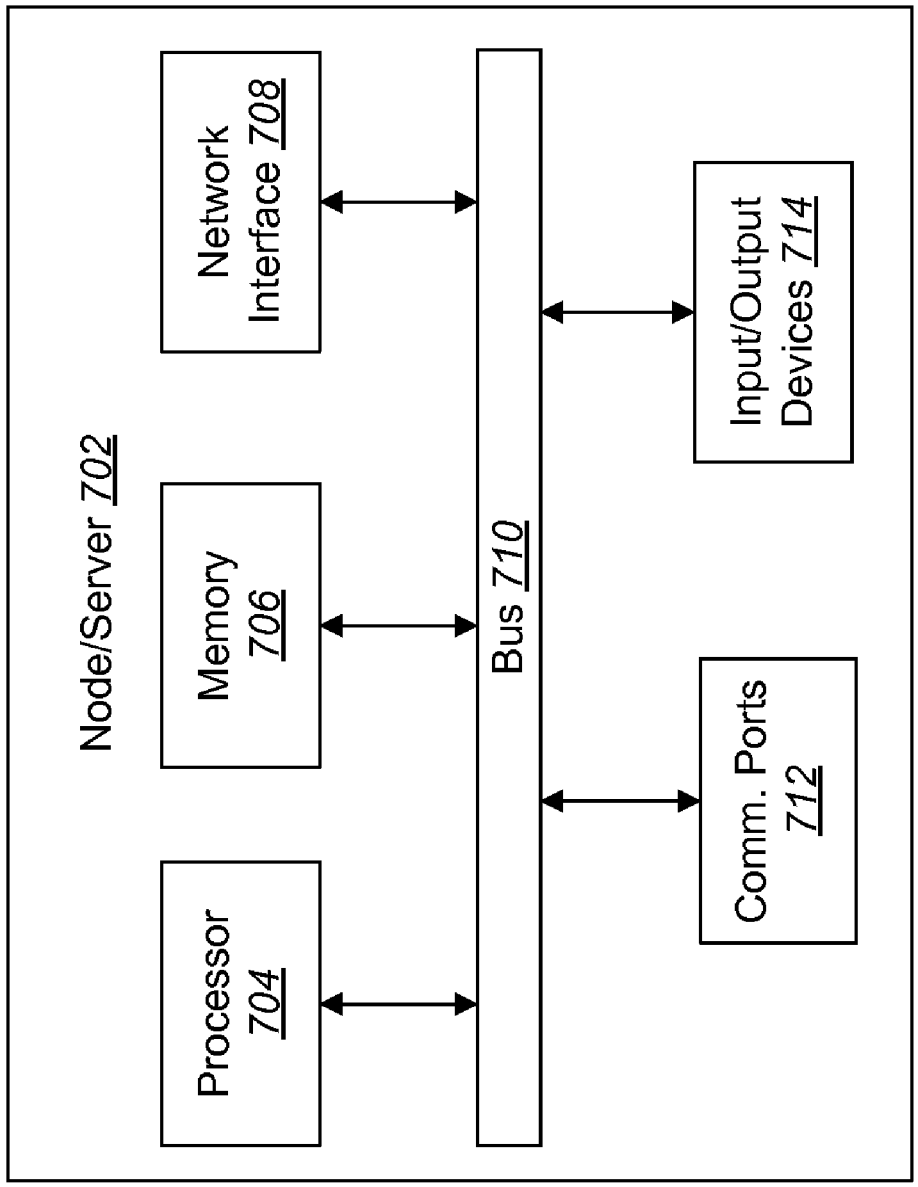
FIG. 7 is a block diagram of hardware components that may be used in a node that is configured according to an embodiment.

FIG. 7 is a block diagram of hardware components that may be used in a node or server 702 that is configured according to an embodiment. The node or server 702 may, in some implementations, be an embedded device. The node or server 702 is generally a computing device. The computing device may include, but is not limited to, a laptop computer, desktop personal computer (PC), personal digital assistant (PDA), tablet PC, cellular telephone, etc. A processor 704 may be provided to control the operation of the node/server 702, including the other components thereof, which are coupled to the processor 704 via a bus 710. The processor 704 may be embodied as a microprocessor, microcontroller, digital signal processor or other device known in the art. The processor 704 performs logical and arithmetic operations based on program code stored within the memory. In certain embodiments, the memory 706 may be on-board memory included with the processor 704. For example, microcontrollers often include a certain amount of on-board memory.

The node/server 702 may also include a network interface 708. The network interface 708 facilitates communication between the node/server 702 and other devices connected to the network 122, which may be a pager network, a cellular network, a global communications network, the Internet, a computer network, a telephone network, etc. The network interface 708 operates according to standard protocols for the applicable network 122.

The node/server 702 may also include memory 706. The memory 706 may include random access memory (RAM) for storing temporary data. Alternatively, or in addition, the memory 706 may include read-only memory (ROM) for storing more permanent data, such as fixed code and configuration data. The memory 706 may also be embodied as a magnetic storage device, such as a hard disk drive. The memory 706 may be any type of electronic device capable of storing electronic information.

The node/server 702 may also include one or more communication ports 712, which facilitate communication with other devices. The node/server 702 may also include input/output devices 714, such as a keyboard, a mouse, a joystick, a touchscreen, a monitor, speakers, a printer, etc.

Of course, FIG. 7 illustrates only one possible configuration of a node/server 702. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for rejoining a second group of nodes with a first group of nodes, the method comprising:
   receiving a first state of a first group key associated with a first group of nodes, wherein a node comprises a computing device having a processor and memory in electronic communication with the processor;
   multicasting the first state of the first group key to a second group of nodes;
   rekeying the first group key to a second group key associated with the second group of nodes;
   multicasting a second state of the second group key to the second group of nodes;

receiving a third state of a third group key associated with the first group of nodes;

multicasting a rekey command to the second group of nodes if the third state is different from the second state; and rekeying the second group key to the third group key.

2. The method of claim 1, wherein the first group is a secure multicast group of nodes.

3. The method of claim 1, wherein the first state is sent from a managing node of the first group of nodes.

4. The method of claim 1, wherein the second state is sent from a managing node of the second group of nodes.

5. The method of claim 1, further comprising partitioning one or more nodes of the first group of nodes into the second group of nodes.

6. The method of claim 5, wherein communications between the managing node of the first group of nodes is disconnected from the nodes comprising the second group of nodes.

7. The method of claim 1, wherein each state includes a key exchange key (KEK).

8. The method of claim 7, wherein the nodes that include the key exchange key (KEK) receive each state.

9. The method of claim 1, wherein each group key includes a group key parameter, wherein the group key parameter indicates the amount of time each group key has been utilized by a group of nodes.

10. The method of claim 1, further comprising selecting a managing node that comprises the group key with the highest group key parameter.

11. The method of claim 1, wherein each node comprising the first group of nodes and the second group of nodes comprises a node identifier, wherein the node identifier indicates the order of when the node joined the first group of nodes.

12. The method of claim 11, further comprising selecting a managing node that comprises the lowest node identifier.

13. The method of claim 1, wherein the rekey command is encrypted with a group key.

14. The method of claim 1, wherein a managing node of the second group of nodes comprises the first group key and the second group key.

15. A computer system that is configured to rejoin a second group of nodes with a first group of nodes, the computer system comprising:

a processor;

memory in electronic communication with the processor;

instructions stored in the memory, the instructions being executable to:

receive a first state of a first group key associated with a first group of nodes;

multicast the first state of the first group key to a second group of nodes;

rekey the first group key to a second group key associated with the second group of nodes;

multicast a second state of the second group key to the second group of nodes;

receive a third state of a third group key associated with the first group of nodes;

multicast a rekey command to the second group of nodes if the third state is different from the second state; and rekey the second group key to the third group key.

16. The computer system of claim 15, wherein each state includes a key exchange key (KEK).

17. The computer system of claim 16, wherein the nodes that include the key exchange key (KEK) receive each state.

18. A non-transitory computer-readable medium comprising executable instructions for rejoining a second group of nodes with a first group of nodes, the instructions being executable to:

receive a first state of a first group key associated with a first group of nodes;

multicast the first state of the first group key to a second group of nodes;

rekey the first group key to a second group key associated with the second group of nodes;

multicast a second state of the second group key to the second group of nodes;

receive a third state of a third group key associated with the first group of nodes;

multicast a rekey command to the second group of nodes if the third state is different from the second state; and rekey the second group key to the third group key.

19. The non-transitory computer-readable medium of claim 18, wherein each state includes a key exchange key (KEK).

20. The non-transitory computer-readable medium of claim 19, wherein the nodes that include the key exchange key (KEK) receive each state.

* * * * *